United States Patent [19]

Bottelberghe et al.

[11] Patent Number: 5,593,619
[45] Date of Patent: Jan. 14, 1997

[54] GRANULATED FLAME RETARDANT PRODUCTS

[75] Inventors: Scott A. Bottelberghe, Waldo, Ark.; Dustin H. Thomas, Baton Rouge, La.; Terry M. Shurtleff, Emerson; Roland G. Poertner, Magnolia, both of Ark.

[73] Assignee: Albemarle Corporation, Richmond, Va.

[21] Appl. No.: 406,225

[22] Filed: Mar. 16, 1995

Related U.S. Application Data

[60] Continuation of Ser. No. 152,292, Nov. 12, 1993, abandoned, which is a division of Ser. No. 964,941, Oct. 22, 1992, abandoned.

[51] Int. Cl.$^6$ ............................ C09K 21/08; C09K 21/14
[52] U.S. Cl. ........................... 252/609; 252/601; 100/38; 100/93 RP; 524/467; 570/186
[58] Field of Search .................................. 252/609, 601; 100/38, 72, 93 RP; 524/467; 570/186

[56] References Cited

U.S. PATENT DOCUMENTS

| | | | |
|---|---|---|---|
| 2,514,616 | 7/1950 | Adams | 78/0.5 |
| 3,193,377 | 7/1965 | Guseman et al. | 75/3 |
| 3,544,641 | 12/1970 | Versnel | 570/246 |
| 3,558,727 | 1/1971 | Jenkner et al. | 570/246 |
| 3,652,688 | 3/1972 | Olechowski et al. | 570/246 |
| 3,833,675 | 9/1974 | Newcombe et al. | 570/246 |
| 3,897,389 | 7/1975 | Touval | 524/410 |
| 3,908,068 | 9/1975 | MacKenzie, Jr. et al. | 428/389 |
| 4,022,856 | 5/1977 | Maxey | 264/26 |
| 4,022,945 | 5/1977 | MacKenzie, Jr. et al. | 428/389 |
| 4,089,912 | 5/1978 | Levek et al. | 524/112 |
| 4,102,853 | 7/1978 | Kawamura et al. | 524/425 |
| 4,182,799 | 1/1980 | Rodish | 521/98 |
| 4,243,579 | 1/1981 | Keogh | 524/423 |
| 4,304,874 | 12/1981 | DiGiulio et al. | 521/82 |
| 4,327,197 | 4/1982 | DiGiulio et al. | 521/147 |
| 4,341,881 | 7/1982 | Kracklauer et al. | 524/176 |
| 4,377,506 | 3/1983 | Sprague | 252/609 |
| 4,530,880 | 7/1985 | Taniuchi et al. | 428/402 |
| 4,546,126 | 10/1985 | Breitenfellner et al. | 523/216 |
| 4,616,042 | 10/1986 | Avakian | 521/81 |
| 4,668,720 | 5/1987 | Kauth et al. | 524/86 |
| 4,783,563 | 11/1988 | Taniuchi et al. | 570/246 |
| 4,849,134 | 7/1989 | Georlette et al. | 252/601 |
| 4,918,253 | 4/1990 | Hermolin et al. | 570/231 |
| 4,965,021 | 10/1990 | Georlette et al. | 252/609 |
| 5,004,847 | 4/1991 | Beaver et al. | 570/186 |
| 5,004,848 | 4/1991 | Beaver | 570/206 |
| 5,043,492 | 8/1991 | Ransford | 570/186 |
| 5,077,444 | 12/1991 | Cook, Jr. et al. | 570/264 |
| 5,084,213 | 1/1992 | Ranken | 252/601 |
| 5,091,057 | 2/1992 | Jensen | 203/18 |

FOREIGN PATENT DOCUMENTS

| | | |
|---|---|---|
| 0037895 | 2/1981 | European Pat. Off. . |
| 0181414 | 11/1984 | European Pat. Off. . |
| 2617366 | 4/1976 | Germany . |
| 3120621 | 12/1982 | Germany . |
| 3447631 | 7/1986 | Germany . |
| 50-5187 | 2/1975 | Japan . |
| 1488204 | 6/1989 | U.S.S.R. . |
| 2205830 | 12/1988 | United Kingdom . |

OTHER PUBLICATIONS

"Agglomeration—The State of the Art", Holley, Carl A., Symposium on Fine Powder Processing, Las Vegas, NE (1980)—pp. 1–20.

"Briquetting And Compacting", Holley, Carl. A., Symposium on Fine Powder Processing, Las Vegas, NE (1980)—pp. 1–10.

(List continued on next page.)

*Primary Examiner*—Sharon Gibson
*Assistant Examiner*—Joseph D. Anthony
*Attorney, Agent, or Firm*—E. E. Spielman, Jr.

[57] ABSTRACT

This invention relates to compositions containing improved granulated hexabromocyclododecane flame retardant products, flame retardant formulations containing products, and to a process for forming the improved granulated flame retardant products, wherein the granulated product is characterized as having a friability loss of less than about 8 percent.

3 Claims, 3 Drawing Sheets

OTHER PUBLICATIONS

"Chemical Engineers' Handbook", Perry & Chilton, 5th Edition (1973)—pp. 8-58–8-61.

"Chemical Engineers' Handbook", Perry, John H., et al., Fourth Edition, McGraw–Hill, New York (1963)—pp. 8-59–8-64.

"The development of briquetting presses over the last 25 years", Rieschel, Dr. -Ing. H., Koppern Equipment, Inc., Charlotte, NC (1984).

"Encyclopedia Of Chemical Technology"—Kirk–Othmer, Third Edition, vol. 21, John Wiley & Sons, New York (1983)—pp. 77–131.

"Modern Equipment And Plants For Potash Granulation", Pietsch, W. B., Koppern Equipment, Inc., Charlotte, NC (1983)—pp. 661–669.

ns application is a continuation of application Ser. No. 08/152,292, filed Nov. 12, 1993, now abandoned, which is a division of application Ser. No. 07/964,941, filed Oct. 22, 1992, now abandoned.

GRANULATED FLAME RETARDANT PRODUCTS

This application is a continuation of application Ser. No. 08/152,292, filed Nov. 12, 1993, now abandoned, which is a division of application Ser. No. 07/964,941, filed Oct. 22, 1992, now abandoned.

BACKGROUND

This invention relates to improved granular flame retardant products, to a process for preparing the same, and to flammable macromolecular materials containing the improved granular flame retardant products.

It is well known in the art to use halogenated hydrocarbons to impart flame retardancy to flammable macromolecular materials. The halogenated hydrocarbons used as flame retardants are typically supplied commercially in powder form. While flame retardants in powder form provide certain advantages, such as mixing and dispersion in macromolecular materials, handling powdered materials is not without significant disadvantages. Powdered materials tend to generate a significant amount of dust which may not only be toxic, but create a safety hazard when the powders are spilled in the work areas. Hence there is a trend in the industry toward providing granulated flame retardant products which do not pose as much health and safety concerns. Such granulated products should have a size and strength which provides good dispersion in macromolecular formulations without forming a significant amount of powder or fines during granulating, handling and storage operations.

While granulated products from powders can be made by adding certain binding agents to the powders, generally the most widely used binding agents do not possess flame retardant properties. Thus when forming granulated flame retardant products, it is highly desirable to minimize or eliminate the use of binding agents which are not flame retardant. However, without binding agents, the granulated flame retardant product may not possess the desired strength, i.e. may be more friable than a granulated product made with binding agents. For purposes of this invention, the friability loss of the granulated flame retardant product is a measurement of the degree with which a sample of product crumbles or otherwise forms powder during grinding, handling, and/or transporting the product.

SUMMARY OF THE INVENTION

Accordingly, this invention provides, inter alia, a process for improving the compaction efficiency of a roll compactor comprising: (a) heating rolls of a pressure compactor to a temperature of greater than about 35° C.; (b) feeding a powdered material to the heated compactor rolls; and (c) applying an amount of force to the powdered material sufficient to form a compacted material, whereby there is more than a 5 percent increase in compaction efficiency.

In a preferred embodiment, this invention provides an improved granulated flame retardant product predominant in hexabromocyclododecane, wherein the granulated product is characterized as having a friability loss of less than about 8 percent.

In yet another embodiment, this invention provides an improved granulated flame retardant product predominant in hexabromocyclododecane formed by a process comprising: a) heating pressure compactor rolls to a temperature of greater than about 35° C., preferably from about 50° to about 80° C.; (b) feeding the hexabromocyclododecane predominant product in powder form to the pressure compactor; (c) applying an amount of hydraulic pressure to the compactor rolls sufficient to compact the product; and (d) granulating the product so as to form product particles having an average size of between about 0.5 and less than about 2 millimeters.

DETAILED DESCRIPTION

Figure 1:
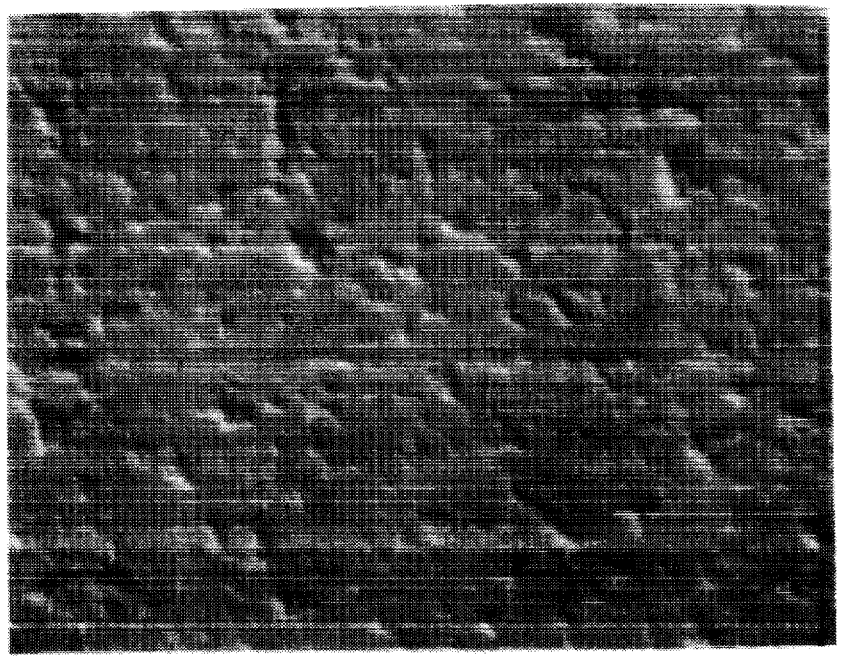
FIG. 1 is a photomicrograph of compacted hexabromocyclododecane at room temperature.

The process of this invention is applicable to a wide variety of solid materials susceptible to agglomeration by compaction. Particularly preferred are halogenated hydrocarbon materials useful as flame retardants which are in solid form at room temperatures. Such halogenated hydrocarbon materials may be selected from any one or more of halogenated alkyls, cycloalkyls, aryls, alkyaryls, aralkyls, aryiimides or annydrides, arylamines, and the like. Preferred halogenated hydrocarbons are octabromodiphenyl ether, octabromodiphenytethane, decabromodiphenyl ether, decabromodiphenylethane, tetrabromobisphenol-A, dibromoneopentylglycol, tetrabromophthalic anhyride, ethylenebistetrabromophthalimide, decabromodiphenyl amine, hexabromocyclododecane, dibromoethyldibromocyclohexane, ethylenebisdibromonorbornanedicarboximide, tetradecabromodiphenyoxybenzene. Particularly preferred are hexabromocyclododecane, octabromodiphenyl ether, decabromodiphenyl ether, octabromodiphenylethane, decabromodiphenylethane, and tetrabromobisphenol-A, with hexabromocyclododecane being the most preferred.

Generally, halogenated hydrocarbons used as flame retardants are formed by halogenating the hydrocarbon in the presence of a solvent. In the case of decabromodiphenyl ether, the solvent is bromine. In the case of hexabromocyclododecane, the solvent is a $C_3$–$C_8$ alkanol, preferably isobutanol, which may or may not contain a minor amount of water. Processes for the formation of decabromodiphenyl ether and hexabromocyclododecane are well known. See for Example Stepniczka U.S. Pat. Nos. 3,965,197 and Re. 32,606; Garman et al. U.S. Pat. No. 4,287,373; Pedjac U.S. Pat. No. 4,521,633; and Brackenridge, et al. U.S. Pat. No. 4,740,629 for decabromodiphenyl ether processes; and Olechowski, et al. U.S. Pat. No. 3,652,688; Versnel U.S. Pat. No. 3,544,641; Jenkner, et al. U.S. Pat. No. 3,558,727; Newcombe, et al. U.S. Pat. No. 3,833,675; Hermolin, et al. U.S. Pat. No. 4,918,253; Tanuichi, et al. U.S. Pat. No. 4,78,563; and Ransford U.S. Pat. No. 5,043,492 for hexabromocyclododecane processes incorporated herein by reference as if fully set forth.

Once formed the halogenated hydrocarbon is separated from the reaction mass by filtration, centrifugation, distillation, decantation, and the like. The solid product thus obtained may be further purified if desired before it is dried.

Typically the product obtained from filtration and centrifugation is a solid mass of loosely agglomerated particles. As an aid to drying of the product, the larger solid masses of product can be ground or milled so as to obtain smaller particles. During the drying and optional grinding and/or milling, a considerable amount of fine particles are generated due to the loosely bound nature of the agglomerated product particles. Accordingly, the product obtained from the drying operation is non-uniform in size and contains a substantial amount of fines or powdered particles. By powdered particles and fines is meant, product particles having an average size of less than 0.5 millimeters in diameter. Once the product is dry, the powdered particles are separated from larger agglomerates by screening. If the desired product is an agglomerated granular particle having a dense mass and a particular average particle size, compaction of the particles may be required. In any case, it is generally desirable to compact, at least a portion of the powdered particles in order to ease handling and reduce safety concerns associated with airborne fines of the product.

In the process of this invention a pressure roll compactor having two opposed counter-rotating rolls is used wherein the compactor rolls are heated to a temperature sufficient to increase the compactor efficiency. Steam, hot water, heat transfer fluid, or the like may be used to heat the compactor rolls to a suitable temperature. For the purposes of this invention, the temperature of the compactor rolls should be sufficient to increase the compactor efficiency, while decreasing the friability of the granulated product thus formed. On the other hand, the temperature of the rolls should not be so high that melting of the product to be compacted occurs. Melting of the product particles may cause the rolls to become encrusted with the melted product which not only inhibits the compaction operation, but may cause the product to become scorched or discolored, leading to the production of a less desirable product.

Accordingly, the temperature of the compactor rolls should be tailored to the particular product being compacted. Typically, the compaction rolls should be heated to a temperature of from about 30° to about 50° C. below the melting point of the flame retardant product. Selection of a suitable temperature for compaction of a hexabromocyclododecane predominant product is particularly troublesome. As the hexabromocyclododecane particles are heated to elevated temperatures, there is a change in isomerization of the product from predominantly gamma orientation: to alpha and beta orientation. The isomerization of the hexabromocyclododecane is not only a function of temperature, but is also a function of time. Thus for an hexabromocyclododecane predominant product, the rolls are preferably heated to above room temperature, more preferably to a temperature in the range of from about 50° to about 150° C., and most preferably from about 50° C. to about 110° C. in order to sufficiently heat the product to the desired temperature.

The compaction force applied to the material to be compacted is likewise critical to obtaining the desired characteristics of the granulated particles. Generally the compaction force applied will be above 40,000 Newtons (N), preferably above about 55,000 and most preferably from about 70,000 N to about 177,000 N. Again, the force used may vary considerably depending on the particular halogenated hydrocarbon to be compacted, the geometric size and shape of the desired compacted material, and the compactor equipment utilized.

Figure 2:
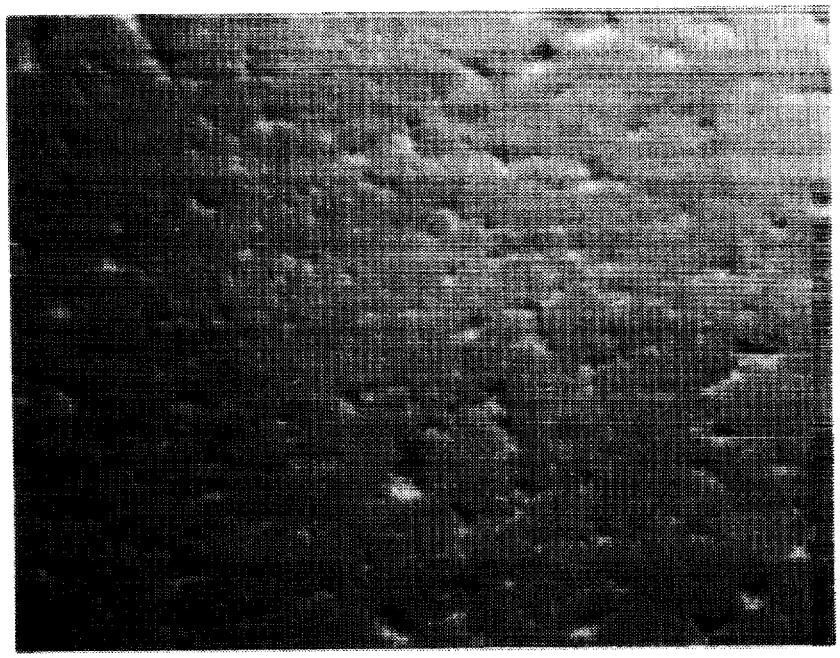
FIG. 2 is a photomicrograph of compacted hexabromocyclododecane wherein the compactor rolls were heated to 30° C. during compaction.
Figure 3:
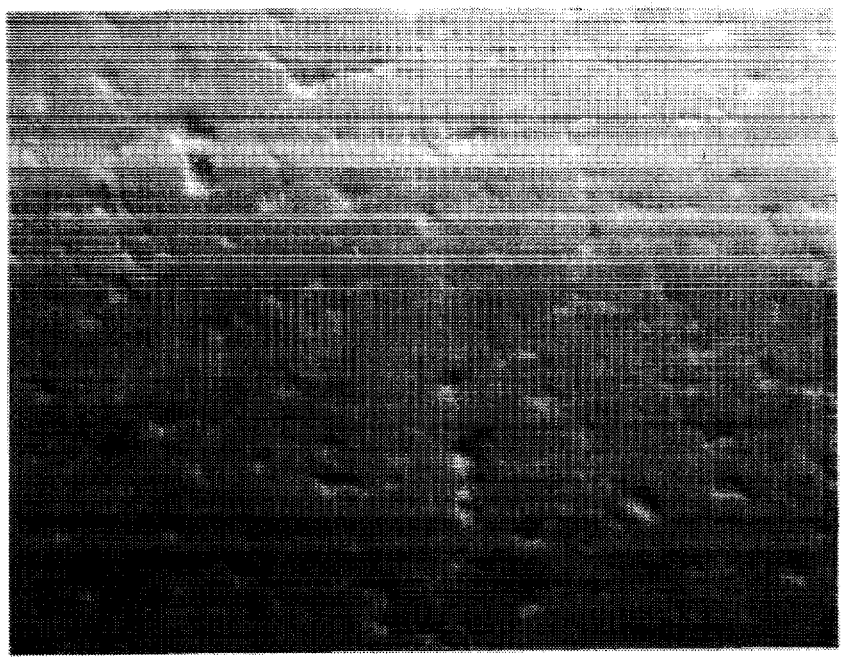
FIG. 3 is a photomicrograph of compacted hexabromocyclododecane wherein the compactor rolls were heated to 50° C. during compaction.
Figure 4:
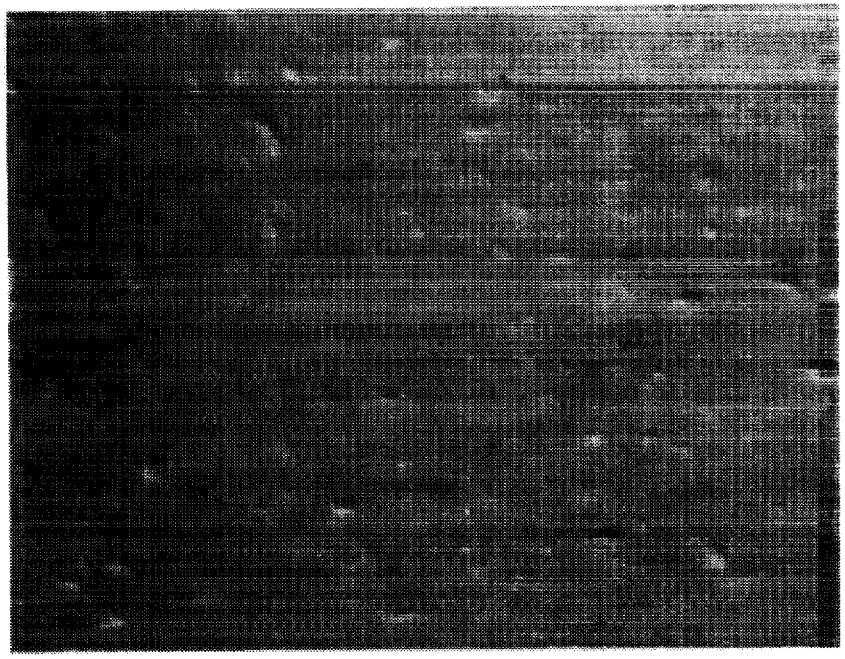
FIG. 4 is a photomicrograph of compacted hexabromocyclododecane wherein the compactor rolls were heated to 100° C. during compaction.

One characteristic of the product made by the process of this invention is the change in the surface texture of the product. By simply observing the surface texture of the compacted product, determination of a suitable compaction force and temperature for compaction can be determined. When viewed under a microscope, the compacted particles made via the process of this invention using heated pressure rolls have a smoother surface texture than can be obtained with pressure alone. For an illustration of the smoother surface texture of the compacted particles, reference is made to FIGS. 1 through 4. FIG. 1 is a photomicrograph of a hexabromocyclododecane product which has been compacted with an applied force of 91,000 N and a compactor roll temperature of about 25° C. In comparison, using the same pressure and a compactor roll temperature of 30° C., the compacted product has a surface texture depicted by FIG. 2. An even more dramatic change in the surface texture can be seen by increasing the compaction roll temperature to 50° C. (FIG. 3) and 100° C. (FIG. 4) using the same pressure. While not desiring to be bound by theory, it is believed that not only does the material flow to fill voids due to changes in the plasticity of the product during the compaction process, but there is bridging between adjacent product particles caused by particle sintering or melting which thereby yields the smoother surface which is observed. Thus there is a physical change in the product which, heretofore, has not been achievable by pressure alone.

Once compacted, the product is then granulated to a uniform particle size by feeding the product to a mill or granulator. Such a mill will fracture the compacted product so as to obtain a product having an average particle size of from about 0.4 to about 7.0 millimeters in diameter or larger. Preferably the average particle size ranges from about 0.5 to about 3.0 millimeters. It has been found that an average particle size of about 0.5 to less than about 2 millimeters in diameter, is optimal for handling purposes for hexabromocyclododecane predominant products. By average particle size is meant that the particles have a size distribution which follows a characteristic bell shaped curve, wherein a majority of the particles (i.e. greater than about 90%) fall within the range of 0.5 to 2 millimeters. In terms of particle size distribution, the preferred product, when screened, will have less than 0.1 weight percent of the product on a 3 mesh screen and 0.7 to less than 5.0 weight percent of the product will pass through a 35 mesh screen.

An advantage of the product of this invention is the reduction in volume of flame retardant material which has been compacted and granulated as compared to the corresponding powdered compositions. Such compacted and granulated product has an increase in bulk density of greater than about 2 percent, more preferably greater than about 5 percent, and most preferably, greater than about 7 percent. By reducing the volume, substantial savings in transportation and storage of the material can be obtained.

A critical feature of the product particles produced by the process of this invention is the friability loss of the product when subject to shaking and particle abrasion. For purposes of this invention, friability loss is defined as the weight of fines divided by the total initial weight of product. To determine friability loss for a granulated product, product fines are generated by shaking the particles such that there is contact between adjacent particles which causes the particles to abrade or crumble. By weighing the amount of fines generated by such shaking, the friability loss in percent can be determined. It is highly desirable to decrease the friability loss of the product to less than about 15 percent, more preferably, less than about 10 percent, and most preferably less than about 8 percent.

While there is considerably less fines or powder formed during granulation after the product has been compacted than when the product is milled prior to compaction, there is still a portion of the product which must be recycled to the compactor due to fines generation in the granulator. However, the process of this invention has been found, quite unexpectedly, to decrease the amount of recycle of fines to the compactor. Since less product is being recycled to the compactor, there is an increase in the compaction throughput or compaction efficiency. For purposes of this invention, compaction efficiency is expressed as the total amount of product by weight fed to the compactor minus the amount of product by weight recycled as fines divided by the total weight of product initially fed. Using the process of this invention, the compaction efficiency may be increased by more than about 5 percent, preferably more than about 8 percent, most preferably more than about 10 percent.

Unlike many compaction systems, it has been found that acceptable compaction efficiencies, and products having low friability loss can be obtained without the use of binder materials. Thus, on a weight basis, the product of this invention exhibits a high degree of flame retardancy due to the absence of binder materials which are hoe flame retardant.

The compacted and granulated flame retardant product of this invention may be used as a flame retardant in formulations with virtually any flammable material. The material may be macromolecular, for example, a cellulosic material or a polymer. Illustrative polymers are: olefin polymers, cross-linked and otherwise, for example, homopolymers of ethylene, propylene, and butylene; copolymers of two or more of such alkylene monomers and copolymers of one or more of such alkylene monomers and any other copolymerizable monomers, for example, ethylene/propylene copolymers, ethylene/ethyl acrylate copolymers and ethylene/vinyl acetate copolymers; polymers of olefinically unsaturated monomers, for example, polystyrene, e.g. high impact polystyrene, and styrene copolymers; polyurethanes; polyamides; polyimides; polycarbonates; polyethers; acrylic resins; polyesters, especially poly(ethyleneterephthalate) and poly(butyleneterephthalate); epoxy resins; alkyls; phenolics; elastomers, for example, butadiene/styrene copolymers and butadiene/acrylonitrile copolymers; terpolymers of acrylonitrile, butadiene and styrene; natural rubber; butyl rubber; and polysiloxanes. The polymer may also be a blend of various polymers. Further, the polymer may be, where appropriate, cross-linked by chemical means or by irradiation.

The amount of product used in a formulation will be that quantity needed to obtain the flame retardancy sought. It will be apparent to the practitioner that for all cases no single precise value for the proportion of the product in the formulation can be given since this proportion will vary with the particular flammable material, the presence of other additives and the degree of flame retardancy sought in any given application. Further, the proportion necessary to achieve a given flame retardancy in a particular formulation will depend upon the shape of the article into which the formulation is to be made; for example, electrical insulation, tubing, and film will each behave differently. In general, however, the formulation may contain to from about 5 to about 40 wt. percent, preferably 10 to 30 weight percent, of the product when it is the only flame retardant compound in the formulation.

It is especially advantageous to use the product with an inorganic compound, especially ferric oxide, zinc oxide, zinc borate, the oxide of a Group V element, for example, bismuth, arsenic, phosphorus and especially antimony, in the formulation. Of these compounds, antimony oxide is especially preferred. If such a compound is present in the formulation, the quantity of product needed to achieve a given flame-retardancy is accordingly reduced. Generally, the product and the inorganic compound are in a weight ratio of from about 1:1 to about 7:1, and preferably of from about 2:1 to about 4:1.

Formulations containing a flame retardant system comprised of the product of this invention and the above inorganic compounds may contain up to about 40 percent by weight of the system and preferably between 20 percent and 30 percent by weight.

Any of the additives usually present in formulations, e.g. plasticizers, antioxidants, fillers, pigments, UV stabilizers, etc. can be used in formulation with the product of this invention.

Thermoplastic articles formed from formulations containing a thermoplastic polymer and a product of this invention can be produced conventionally, e.g. by injection molding, extrusion molding, compression molding, and the like.

In order to further illustrate the features and advantages of this invention, the following examples are given. These examples are not meant to limit or restrict this invention in any manner.

EXAMPLE 1

Hexabromocyclododecane (10 grams) was loaded into the cylinder of a tablet press having a 2.9 centimeter diameter cylinder/piston and a 30 ton hydraulic press. The tablet press was obtained from SPEX, model No. 3642 B. The tablets were removed from the tablet press, weighed and subjected to a roll mill obtained from U.S. Stoneware model No. CV 89335. After milling, the tablets were again weighed to determine the percent friability loss. Results of this test are as follows:

| OPERATING CONDITIONS | DENSITY (g/cm³) | FRIABILITY LOSS (%) |
|---|---|---|
| Force Applied: 89,000 N Housing Temp.: 25° C. Powder Temp.: 25° C. | 2.031 | 13.2 |
| Force Applied: 89,000 N Housing Temp.: 50° C. Powder Temp.: 25° C. | 2,075 | 0.4 |
| Force Applied: 89,000 N Housing Temp.: 100° C. Powder Temp.: 25° C. | 2.189 | 0.3 |

EXAMPLE 2

A second series of compaction tests was performed on a CHILSONATOR roll compactor from Fitzpatrick Co. model No. 4L X 10D having 10.1 centimeter wide rolls which are 25.4 centimeters in diameter. In these series of tests, heating and cooling was applied to the rolls of the compactor. A baseline test (Run 1) was performed using a hydraulic pressure of 3.65 MPa (530 psia) to give an applied force of 90,000 N (10.1 tons) with no heating or cooling on the compactor rolls. The product from the compactor had a bulk temperature of 29° C. and a friability loss of: 8.6% through a 30 mesh screen after 20 minutes.

A second test (Run 2) was performed on the same compactor using a hydraulic pressure of 5 MPa (730 psia) to give an applied force of 125,000 N (14 tons). The product from this test had bulk temperature of 30° C. and a friability loss of 8.2% through a 30 mesh screen after 20 minutes.

In a third test (Run 3), the same pressure as the baseline test was used, however water at 93° C. was circulated through the compactor rolls to heat the surface of the rolls. Once the rolls reached an equilibrium temperature, the product was compacted and granulated. The resulting granular product had a bulk temperature of 42.8° C. and a friability loss of 6.5% through a 30 mesh screen after 20 minutes.

Friability Test Procedure

Hexabromocyclododecane (100 grams) is placed on a 30 mesh screen. The material is sieved for one minute on a CE Tyler portable sieve shaker model RX24. The sieve shaker generates an up and down shaking motion with very little side to side motion. The material on the 30 mesh screen and the material collected through the 30 mesh screen is weighed to determine the starting weights of material.

After weighing, the screens containing the material are placed back in the shaker and sieved for a period of time. At each time interval, the material on the 30 mesh screen and in the pan of the shaker are weighed to determine the friability loss of the product. The friability loss is the amount of material collected through the 30 mesh screen divided by the starting material on the 30 mesh screen.

Table 1 is an analysis of the friability loss of the product in each of the foregoing runs as a function of time using the foregoing Friability Test Procedure.

pactor roll temperature and pressure is given in the following Table 2.

TABLE 2

| Run # | Temperature (°C.) | Compaction Force (N) | Compaction Efficiency (%) |
|---|---|---|---|
| 1 | 27 | 12,400 | 58.9 |
| 2 | 100 | 9,600 | 44.5 |
| 3 | 100 | 12,400 | 54.7 |
| 4 | 27 | 18,200 | 58.2 |
| 5 | 27 | 9,600 | 54.4 |
| 6 | 27 | 15,300 | 57.3 |
| 7 | 100 | 15,300 | 72.3 |
| 8 | 27 | 24,000 | 62.5 |
| 9 | 100 | 24,000 | 80.1 |

Figure 5:
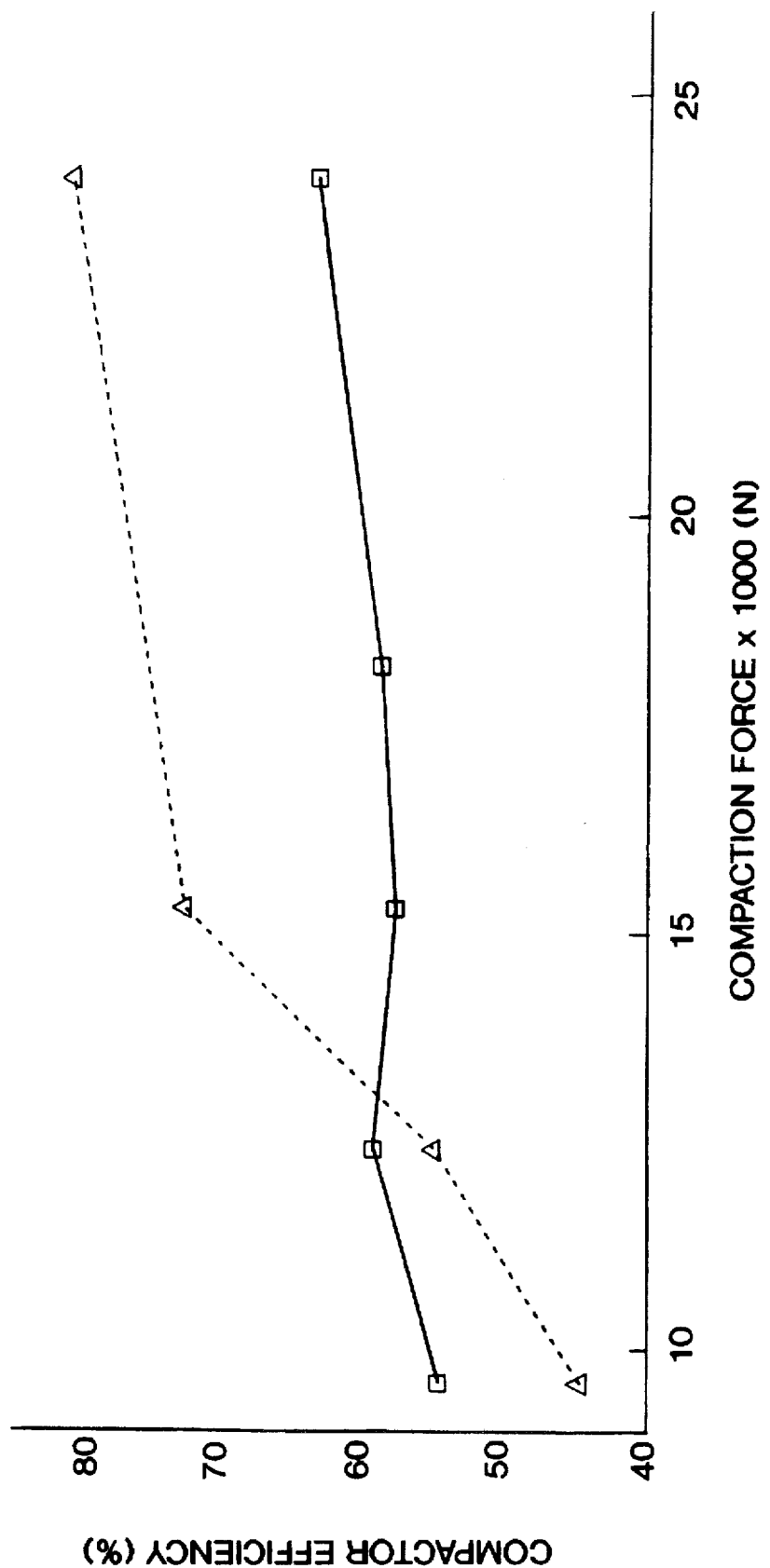
FIG. 5 is a graphical representation of compaction efficiency versus the compaction force for two different compactor roll temperatures.

From this series of tests it is apparent that there is a substantial increase in compactor efficiency when the compactor rolls are heated during the compaction process. FIG. 5 is a graphical representation of the data given in Table 1.

Variations of the invention are within the spirit and scope of the appended claims.

What is claimed is:

1. A process for producing unscorched, binder-free, granulated hexabromocyclododecane which exhibits enhanced compaction efficiency and friability, said process comprising the following steps:

(a) feeding a binder-free hexabromocyclododecane powder to a set of heated compaction rollers to effect the

TABLE 1

|  | RUN 1 | | | RUN 2 | | | RUN 3 | | |
|---|---|---|---|---|---|---|---|---|---|
| Time (min.) | 30 mesh weight[1] (grams) | Pan weight[2] (grams) | Friability Loss (%) | 30 mesh weight[1] (grams) | Pan weight[2] (grams) | Friability Loss (%) | 30 mesh weight[1] (grams) | Pan weight[2] (grams) | Friability Loss (%) |
| 0 | 103.3 | 1.0 | 0.0 | 98.4 | 2.5 | 0.0 | 93.0 | 7.6 | 0.0 |
| 5 | 100.5 | 3.9 | 2.8 | 94.5 | 6.5 | 4.1 | 90.7 | 10.0 | 2.6 |
| 10 | 98.4 | 6.0 | 4.8 | 93.3 | 7.5 | 5.1 | 89.6 | 11.0 | 3.7 |
| 15 | 96.9 | 7.5 | 6.3 | 92.1 | 8.9 | 6.5 | 88.6 | 12.0 | 4.7 |
| 0 | 95.9 | 8.5 | 7.3 | 91.4 | 9.5 | 7.1 | 88.0 | 12.6 | 5.4 |
| 30 | 94.5 | 9.9 | 8.6 | 90.3 | 10.6 | 8.2 | 87.0 | 13.6 | 6.5 |
| 40 | 93.5 | 10.9 | 9.6 | — | — | — | 86.3 | 14.3 | 7.2 |

[1]Does not include tare weight of 30 mesh screen of 669.3 grams.
[2]Does not include tare weight of pan of 388.2 grams.

EXAMPLE 3

A third series of tests was performed on a Chilsonator roll compactor from Fitzpatrick Company, Model L83 having rolls 3.8 centimeters wide and 20 centimeters in diameter. The third series of tests were performed to determine the effects of temperature and applied compaction force on compaction efficiency. In each run 100 grams of hexabromocyclododecane product was collected from the compactor. The product was screened and the amount of product passing through a 35 mesh screen was the fine and their weight was determined. For the purposes of this invention, fines have an average particle size distribution of less than 0.5 mm in diameter. Compaction efficiency was calculated by the following formula:

$$\text{Compaction Efficiency} = \frac{(\text{Initial wt.}) - (\text{Wt. of fines})}{\text{Initial sample weight}}$$

In runs 1–9, the temperature and the compaction force applied to powder were varied and all other variables were held constant. Compaction efficiency as a function of comformation of a hexabromocyclododecane compacted material, the rollers having been heated to a temperature from about 35° C. to about 150° C. which is in excess of the fed hexabromocyclododecane powder temperature such that the compaction efficiency is increased by at least 10 percent over that obtained with non-heated compaction rollers, and wherein the compaction step is performed without scorching the compacted material; and (b) granulating the compacted material to produce. granules which have a friability loss of less than about 10 percent.

2. The process of claim 1 wherein the granules produced by granulating the compacted material in step (b) have a friability loss of less than about 8 percent.

3. The process of claim 1 wherein the granules produced by granulating the compacted material in step (b) have an average particle size within the range of from about 0.5 to about 2 millimeters in diameter.

* * * * *